United States Patent [19]
Balke et al.

[11] 4,134,309
[45] Jan. 16, 1979

[54] FLANGE SPRING RESERVOIR FOR A VIBRATION DAMPER

[75] Inventors: Rodney W. Balke, Arlington; Frank R. Oradat, Hurst; Cecil W. Haga, Arlington, all of Tex.

[73] Assignee: Textron Inc., Providence, R.I.

[21] Appl. No.: 739,272

[22] Filed: Nov. 5, 1976

[51] Int. Cl.² .......... F16F 15/22; F16F 15/04; F16C 35/00
[52] U.S. Cl. .............. 74/573 F; 308/9; 308/26; 248/562; 64/1 V
[58] Field of Search .............. 416/500, 144, 145; 192/30 V; 308/184 R, 184 A, 237 R, 237 A, 9, 26; 248/20, 8, 7, 21, 22, 15, 18, 24, 358 R, 358 AA; 188/1 B, 298, 322; 415/104, 107; 64/1 V; 73/66, 455, 457, 458; 74/573, 573 F, 574, 572; 123/41.84

[56] References Cited

U.S. PATENT DOCUMENTS

| | | | |
|---|---|---|---|
| 2,251,390 | 8/1941 | Beede | 74/572 X |
| 2,814,462 | 11/1957 | Jarnett | 74/574 X |
| 2,916,283 | 12/1959 | Westcott, Jr. | 248/358 R |
| 3,088,268 | 5/1963 | Holschlag et al. | 248/358 R |
| 3,263,450 | 8/1966 | Condon | 64/1 V X |
| 3,324,254 | 6/1967 | Shaw et al. | 248/358 R X |
| 3,415,470 | 12/1968 | Woodford et al. | 248/15 X |
| 3,481,316 | 12/1969 | Olson et al. | 123/41.84 |
| 3,653,625 | 4/1972 | Plice | 248/358 R |
| 3,701,499 | 10/1972 | Schubert et al. | 248/358 R X |
| 3,751,044 | 8/1973 | Sawada | 308/9 X |
| 3,828,217 | 8/1974 | Ebersberger | 74/574 X |
| 3,967,707 | 7/1976 | Carlton | 188/298 X |

*Primary Examiner*—Samuel Scott
*Assistant Examiner*—Don E. Ferrell
*Attorney, Agent, or Firm*—Richards, Harris & Medlock

[57] ABSTRACT

A relatively stiff spring cooperating with an oil film resists inertial, gearing, and chucking loads and reduces the inertial forces generated by the operation of a rotatable shaft. The rotatable shaft is mounted directly in conventional ball bearings that in turn are mounted in engagement with the inner of two concentrically mounted cylindrical members, wherein the concentrically mounted members have facing walls radially displaced to form an annular cavity therebetween. The outer of the two cylindrical members is in engagement with and supported to the housing. Interconnecting the two cylindrical members is a flange spring that also serves as an end wall for a reservoir in communication with the annular cavity. The reservoir and the annular cavity are filled with a dampening fluid, such as a lubricating oil, to serve as a cushion for axially and radially directed force transfers between the two concentrically mounted members.

16 Claims, 5 Drawing Figures

FLANGE SPRING RESERVOIR FOR A VIBRATION DAMPER

This invention relates to a vibration damper, and more particularly to a vibration damper with a flange spring and annular cavity for maintaining gear alignment while permitting sufficient damper motion to achieve acceptable damping to resonance vibrations or to subharmonic motions.

Numerous bearing and shaft arrangements are available for resiliently mounting a rotating shaft with respect to a housing wherein a resilient mounting arrangement provides space for a viscous fluid film to dampen excessive vibration during normal operation of the rotating shaft. These prior art arrangements are described as providing a means to prevent critical frequencies from producing destructive vibratory forces in a housing or support structure during the operation of the shaft. Apparatus of the present invention provides an improvement over prior art systems by incorporating a relatively stiff spring, having a 10 to 20 times higher spring rate than prior art systems, to act in cooperation with the oil film, thereby resisting inertial, gearing and chucking loads and also reducing inertial loads produced by vibration inherent in the rotation of a semibalanced shaft.

One application of the present invention is the support of a shaft in a transmission for driving the main rotor assembly of a helicopter. As will be recognized by those familiar with the shafting requirements of the main rotor assembly of helicopters, the rotation of the shafts of the rotor assembly produces shaft radial motion at various frequencies. Such frequencies, in resonance, have been recognized as inflicting very large lateral forces on the housing, shaft or shaft assembly components, often resulting in premature failure or destruction of the rotor assembly shafting or other elements of the assembly.

Although described herein with respect to utilization in a helicopter, it will be understood that the flange-spring and reservoir vibration damper of the present invention also finds utility in other applications where it is desirable to minimize the growth of resonance forces between a rotating shaft and a supporting housing.

In accordance with the present invention, vibrations of a rotatably mounted shaft are isolated from a supporting housing. First and second cylindrical members are concentrically mounted between the supporting housing and conventional bearings providing a rotatable support for the shaft. Facing inner walls of the cylindrical members are radially displaced to form an annular cavity therebetween and radially extending between the cylindrical members is a flange having an outer edge in integral contact with the first member and an inner edge in integral contact with the second member. This flange forms a reservoir between the first and second members that is in communication with the annular cavity therebetween. In one embodiment of the invention a viscous fluid fills the annular cavity and the reservoir formed by the radially extending flange.

A more complete understanding of the invention and its advantages will be apparent from the specification and claims and from the accompanying drawings illustrative of the invention.

Referring to the drawings.

Figure 4:
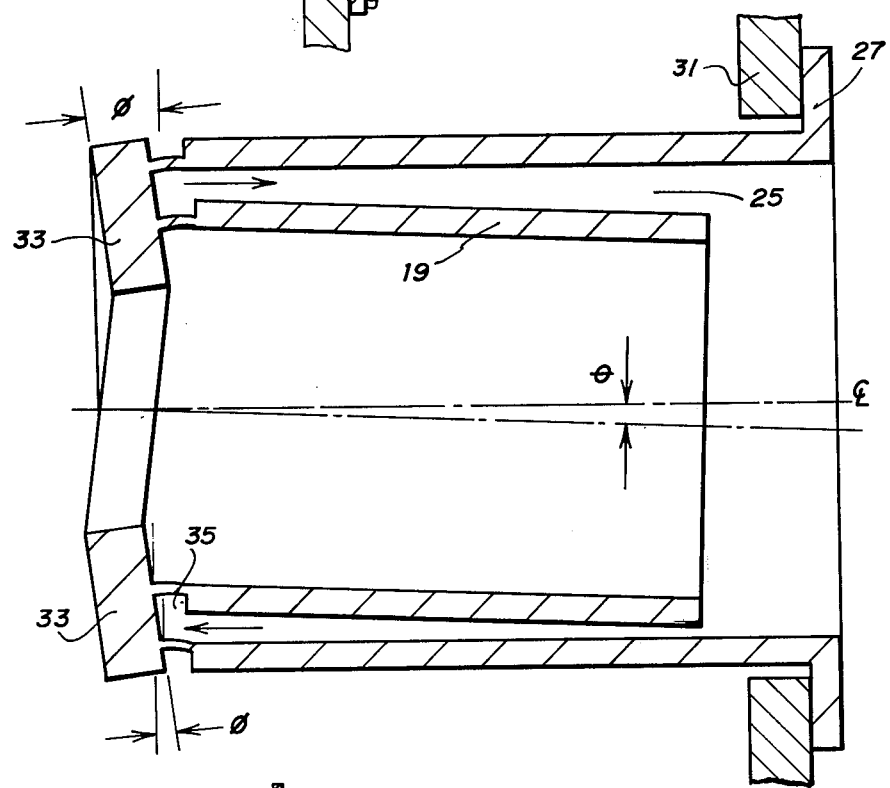
Figure 5:
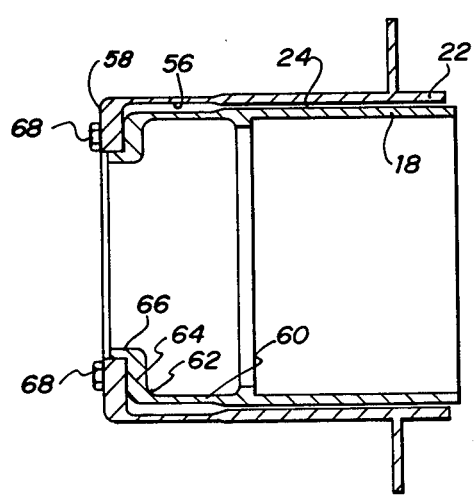

FIG. 4 schematically illustrates the displacement of various members of the damper of the present invention when operating under a loaded condition; and FIG. 5 is a sectional view of an alternate embodiment of the vibration damper of the present invention.

Figure 1:
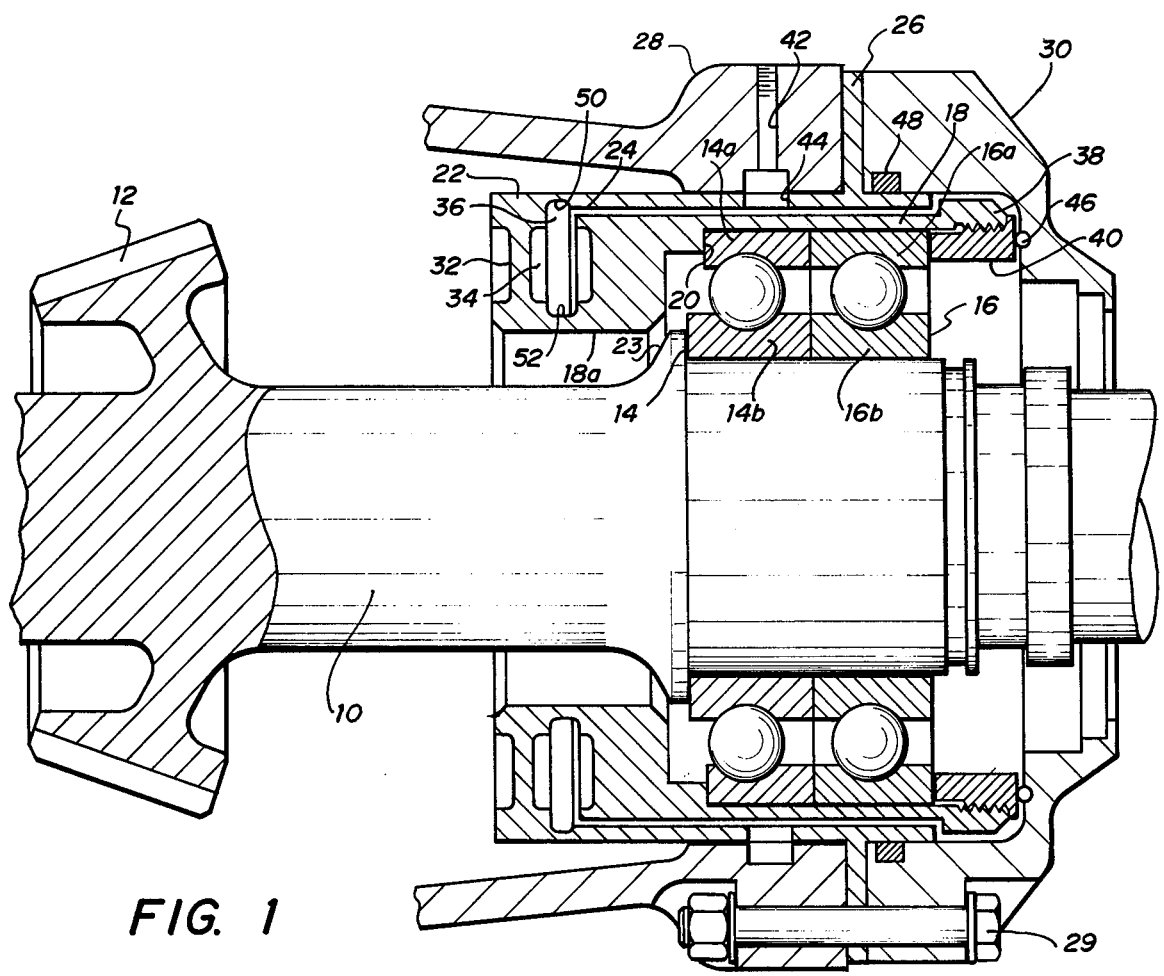
FIG. 1 is an axial sectional view through a shaft and supporting structure including the vibration damper of the present invention.

Referring to FIG. 1, a shaft 10, which may be a drive shaft as a part of the transmission of a helicopter power train, supports a drive gear 12 that engages gearing for imparting rotary motion to the main lifting rotor assembly of a helicopter. The shaft 10 is rotatably mounted in conventional ball bearings shown at 14 and 16 each having an inner race 14b and 16b secured to the shaft 10 against a shoulder 23 and having an outer race 14a and 16a, respectively.

The outer race of each of the bearings 14 and 16 is secured within an inner cylindrical member 18 having a shoulder 20 against which the outer race 14a bears. The inner cylindrical member 18 is mounted concentrically with respect to an outer cylindrical member 22 and radially spaced therefrom to form a thin annular cavity 24. Radially extending from the outer wall of the cylindrical member 22 is a mounting flange 26 for positioning the complete vibration damper assembly in a housing 28. When utilized in a helicopter application, the housing 28 is part of the transmission structure mounted to the helicopter fuselage. The flange 26 is secured to the housing 28 by means of an end cap 30 by means of mounting bolts 29 (only one shown) extending through openings in the cap and the flange into the housing.

Figure 2:
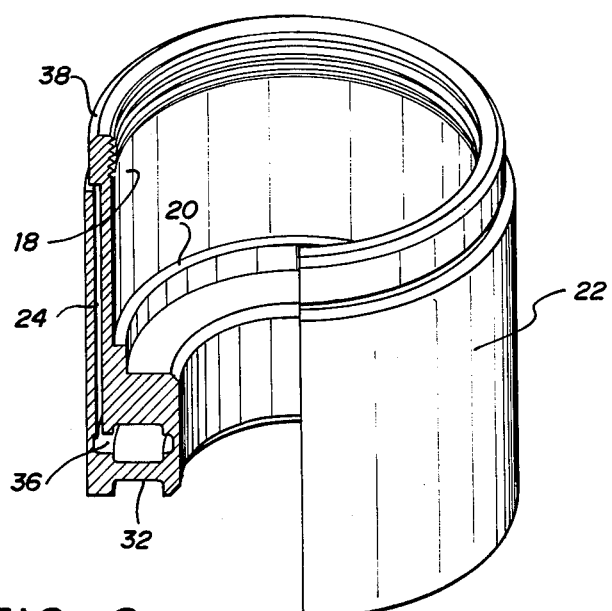
FIG. 2 is a perspective view of the vibration damper removed from the structure of FIG. 1.

Referring to FIGS. 1 and 2, the vibration damper of the present invention comprises the inner cylindrical member 18 and the spaced outer cylindrical member 22 joined by a radially extending flange 32 providing a relatively stiff spring between the cylindrical members 18 and 22. The radially extending flange 32 has an outer end in integral contact with the outer cylindrical member 22 and an inner end in integral engagement with the inner cylindrical member 18.

With specific reference to the inner cylindrical member 18, adjacent the shoulder 20 this member has a radially, inwardly directed shoulder extending toward the shaft 10 forming a ring shaped member 18a. Formed in this enlarged, ring shaped member 18a is an annulus that in conjunction with the flange 32 forms a fluid reservoir 34 in communication with the annular cavity 24 by means of a channel 36.

At the transition between the flange 32 and outer cylindrical member 22 there is provided an annulus 50 as a relief of stresses produced during the operation of the vibration damper. Similarly, an annulus 52 is provided between the flange 32 and the inner cylindrical member 18 to also function as a relief.

At the end of the inner cylindrical member 18, opposite the flange 32, there is formed as an integral part of the member an internally threaded mounting ring 38. Mating with the mounting ring 38 is an externally threaded mounting collar 40, served internally of the mounting ring 38, to bear against the outer race 16a of the bearing 16 to position the vibration damper of FIG. 2 with respect to the shaft 10. Thus, the entire assembly of the bearings 14 and 16 and the vibration damper is fixed in the housing 28 to rotatably support the shaft 10.

Referring to FIG. 1, a fill passage 42 extends radially through the housing 28 and is in alignment with an opening 44 of the outer cylindrical member 22. The fill passage is threaded to receive a standard pressure supply fitting (not shown) for sealing the annular cavity 24. The fill passage 42 is in communication with the annular cavity 24 formed between the cylindrical members 18 and 22. At the mounting collar 40, this annular cavity is sealed by an O-ring 46 during the assembly of the cap 30 to the housing 28. A sealing ring 48 is also fitted into the cap 30 against the outer surface of the cylindrical member 22.

To provide a dampening effect, the reservoir 34 and the annular cavity 24 are filled with a dampening fluid. The dampening fluid may be a low viscosity oil that flows freely into and out of the annular cavity 24 from the reservoir 34.

With the apparatus as described, when the shaft 10 deflects laterally due to vibrations, local lateral displacement of the shaft with respect to the housing 28 is experienced. This lateral displacement produces forces through the bearings 14 and 16 against the inner cylindrical member 18 causing displacement thereof with respect to the outer cylindrical member 22. The amount of displacement between the inner and outer cylindrical members 18 and 22 is determined by the lateral force and the counteracting spring force produced by the radially extending flange 32. The flange 32 thus produces a spring action to partially absorb the lateral forces otherwise directly transmitted to the housing 28.

In addition, the fluid film within the annular cavity 24 provides a damping pressure to further absorb and distribute the laterally generated forces caused by vibrations of the shaft 10. This distribution of forces is a result of a distribution of the fluid film within the annular cavity 24 and further by distribution of the fluid material between the cavity and the reservoir 34 in the ring 18a.

While the fluid film provides some support effects for lateral forces generated by vibration of the shaft 10, the primary support effect is a result of the flange 32 functioning as a spring mount between the inner and outer cylindrical members 18 and 22, respectively. The fluid film becomes effective secondarily when the laterally generated forces deflect the flange interconnecting the two cylindrical members.

Figure 3:
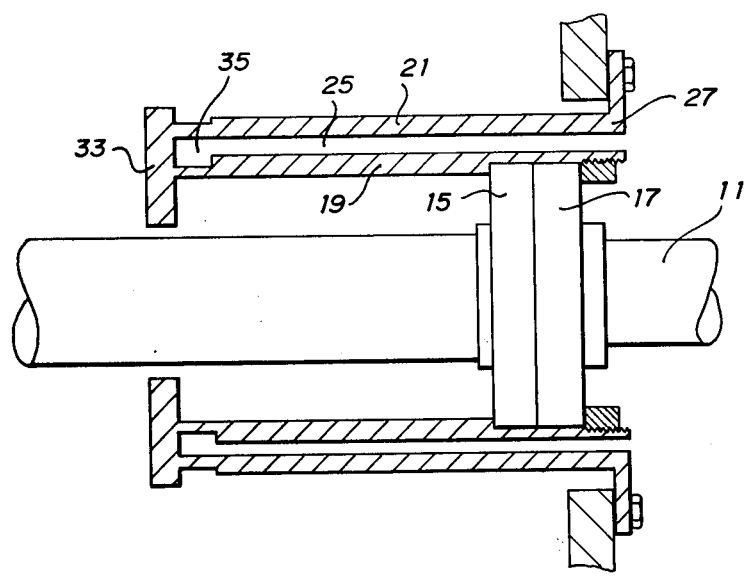
FIG. 3 is a schematic of the damper of the present invention.

Referring to FIG. 3, there is schematically illustrated a shaft 11 rotatably mounted in tandem bearings 15 and 17 supported in the vibration damper of the present invention. An inner cylinder member 19 is concentrically mounted with the shaft 11 and, in the unloaded condition, also concentrically positioned with respect to an outer cylinder member 21. Interconnecting one end of the cylinder members 19 and 21 is a ring spring flange 33 that, as the name implies, is ring shaped and forms between the concentrically mounted cylinder members an annular cavity 25 to be filled with a dampening fluid. Immediately adjacent the ring spring flange 33 between the cylinder members 19 and 21 there is formed an annulus 35 functioning as a fluid reservoir connected to the annular cavity 25.

With the shaft 11 rotating in a neutral transverse load condition, the cylinder members 19 and 21 are in generally a concentric arrangement with the ring spring flange 33 providing the primary support for the shaft. The dampening fluid is generally evenly distributed within the annular cavity 25 and the fluid reservoir 35.

Referring to FIG. 4, as the shaft 11 is put in a transverse load condition the shaft center line is deflected with respect to the center line of the fluid damper. The deflection of the shaft 11 is transmitted through the tandem bearings 15 and 17 to the inner cylinder member 19 which is deflected by the angle $\theta$. However, the outer cylinder 21 is fixed in position with respect to a housing 31 by means of the mounting flange 27. The cylindrical shape of the annular cavity 25 is thus distorted causing a flow of the dampening fluid from one portion of the annular cavity into another portion.

As illustrated in FIG. 4, the dampening fluid is squeezed out of that part of the annular cavity 25 towards the bottom of the vibration damper and flows by means of the fluid reservoir 35 to that part of the annular cavity towards the top of the vibration damper. As mentioned, this dampening fluid provides some support effect for the lateral forces generated by vibration of the shaft 11; however, the primary support is provided by the ring spring flange 33 which is now deflected by an angle $\phi$ from a position perpendicular to the center line of the vibration damper. Since the angles $\phi$ and $\theta$ are not equal, the thin wall sections 19a and 21a of the cylinder members 19 and 21 flex to maintain the compatibility of the parts. The thin wall sections 19a and 21a of the cylinder members 19 and 21 permit the ring spring flange 33 to twist, as illustrated in FIG. 4, without causing excessive bending stresses in the cylinder walls. This flexing of the ring spring flange 33 and deflection of the inner cylinder member 19 and be in any direction with respect to the center line of the vibration damper and under a shaft vibration condition will change with the shaft vibration.

It will be understood that the vibrations of the shaft 11 will not be limited to any one particular radial direction, but rather they in fact propagate around the vibration damper of the present invention. This propagation of vibrating forces will be absorbed by the continuous spring action of the flange 33 which in itself has a ring configuration to absorb forces in any radial direction. This action to provide a smooth and continuous support effect is damped by the fluid film within the annular cavity 25.

Referring to FIG. 5, there is shown an alternate embodiment of the vibration damper incorporating a modified flange assembly. The inner cylindrical member 18 and the outer cylindrical member 22 are similar in shape and displacement as shown in FIG. 2 to form the annular cavity 24. However, at the flange end of the outer cylindrical member 22 there is provided a relief 56 terminating in a ring shaped inwardly directed flange 58. The flange 58 is secured to the relief 56 at substantially right angles to an axis of the outer cylindrical member 22.

At the end of the inner cylindrical member 18 and replacing the ring shaped member 18a there is provided a relief 60 terminating at a shoulder 62 as part of a ring shaped mounting flange 64 and forming a pilot ring 66 for the flange 58. The ring shaped mounting flange 64 is provided with the internally tapped mounting holes (not shown) equally spaced around the ring 64. The mounting holes receive threaded fasteners 68 extending through the flange 58.

As assembled, the flange 58 and the ring 64 cooperate to function as the flange 32 as previously described. The space between the relief 56 and the relief 60 functions as a fluid reservoir in communication with the annular cavity 24.

Functionally, the embodiment of the vibration damper of FIG. 5 is similar to that described with respect to FIGS. 3 and 4. Vibrating forces transmitted from the shaft 10 to the bearings 14 and 16 produce a displacement between the inner and outer cylindrical members 18 and 22, and the amount of this displacement is determined by the lateral force and the counteracting spring force produced by the assembly of the flange 58 and the ring 64.

While several embodiments of the invention, together with modifications thereof, have been described in detail herein and shown in the accompanying drawings, it will be evident that various further modifications are possible without departing from the scope of the invention.

What is claimed is:

1. A vibration damper for mounting between a rotating shaft and a supporting housing, comprising:
   means for rotatably supporting the shaft,
   first and second cylindrical members concentrically mounted between the supporting housing and said means with facing inner walls radially displaced to form an annular cavity therebetween,
   a flexible support including a radially extending flange having one end connected to said first member and the opposite end connected to said second member, and
   an annular reservoir formed by the connection of the flange of said support to said first and second members and opening into the annular cavity therebetween.

2. A vibration damper for mounting between a rotating shaft and a supporting housing as set forth in claim 1 including an outwardly extending mounting flange integral with said first member and clamped to the supporting housing for positioning said first and second members therein.

3. A vibration damper for mounting between a rotating shaft and a supporting housing as set forth in claim 2 including means for sealing the annular cavity at the supporting housing at the end of said second member opposite the radially extending flange.

4. A vibration damper for mounting between a rotating shaft and a supporting housing, comprising:
   a first cylindrical member having an outer wall surface and an inner wall surface,
   a second cylindrical member having an outer wall surface and an inner wall surface and including a stress relief section formed as an integral part thereof,
   said second cylindrical member mounted concentrically with respect to said first member with facing inner surfaces displaced to form an annular cavity,
   a flexible support including a radially extending flange having one end connected to said first member and the opposite end connected to the stress relief section of said second member, and
   an annular reservoir formed by the connection of the flange of said support to said first and second members and opening into the annular cavity therebetween.

5. A vibration damper for mounting between a rotating shaft and a supporting housing as set forth in claim 4 wherein the stress relief section of said second member is formed at one end thereof and said flange has a radial dimension greater than the radial dimension of the annular cavity.

6. A vibration damper for mounting between a rotating shaft and a supporting housing as set forth in claim 4 wherein said first and second members and said flange are formed of a resilient material.

7. A vibration damper for mounting between a rotating shaft and a supporting housing as set forth in claim 4 wherein said radially extending flange comprises a flexible member as a cantilever mount between said first and second members.

8. A vibration damper for mounting between a rotating shaft and a supporting housing as set forth in claim 4 including a damper fluid filling the annular cavity and the reservoir.

9. A vibration damper, comprising:
   first and second cylinders concentrically mounted with facing inner walls radially displaced to form an annular cavity therebetween, each of said cylinders having a stress relief section at one end thereof,
   a flexible support having one end in integral contact with the stress relief section of said first cylinder and the opposite end in integral contact with the stress relief section of said second cylinder, and
   an annular reservoir formed by the connection of said flexible support to said first and second cylinders and opening into the annular cavity therebetween.

10. A vibration damper as set forth in claim 9 including means for sealing the annular cavity at the end of said first and second cylinders opposite the flexible support.

11. A vibration damper as set forth in claim 9 wherein said flexible support comprises a radially extending flange as a cantilever mount between said first and second cylinders.

12. A vibration damper as set forth in claim 9 including a damper fluid filling the reservoir.

13. A vibration damper for mounting between a first member and a second member, comprising:
   first and second cylinders concentrically mounted between said first and second members with facing inner walls radially displaced to form an annular cavity therebetween, each of said cylinders having a stress relief section at one end thereof,
   a flexible support having one end in integral contact with the stress relief section of said first cylinder and the opposite end in integral contact with the stress relief system of said second cylinder, and
   an annular reservoir formed by the connection of said flexible support to said first and second cylinders and opening into the annular cavity therebetween.

14. A vibration damper for mounting between a first member and a second member as set forth in claim 13 wherein said flexible support includes a radially extending flange between the first and second cylinders.

15. A vibration damper for mounting between a first member and a second member as set forth in claim 13 including a damper fluid filling said annular reservoir.

16. A vibration damper for mounting between a rotating shaft and a supporting housing, comprising:
   means for rotatably supporting the shaft,
   a first cylindrical member having an outer wall surface and an inner wall surface and terminating at one end in an inwardly directed flange,
   a second member having an outer wall surface and an inner wall surface and including a stress relief section formed as an integral part thereof, said second cylindrical member including a mounting flange at one end thereof and including a pilot ring to mate with the flange of said first member,
   means for fastening the flange of said first member to the flange of said second member such that said members are concentrically mounted with respect to each other with facing inner surfaces displaced to form an annular cavity, and
   an annular reservoir formed by the connection of the flanges of said first and second members and opening into the annular cavity therebetween.

* * * * *